US012743937B2

(12) United States Patent
Luecke

(10) Patent No.: US 12,743,937 B2
(45) Date of Patent: Sep. 22, 2026

(54) SYSTEMS, METHODS, AND APPARATUSES FOR A MULTI-SENSORY TACTILE SOUND SYSTEM FOR A CHILDREN'S PRODUCT

(71) Applicant: Graco Children's Products, Inc., Atlanta, GA (US)

(72) Inventor: Ryan D. Luecke, Marietta, GA (US)

(73) Assignee: Graco Children's Products, Inc., Atlanta, GA (US)

( * ) Notice: Subject to any disclaimer, the term of this patent is extended or adjusted under 35 U.S.C. 154(b) by 225 days.

(21) Appl. No.: 18/292,661

(22) PCT Filed: Aug. 11, 2022

(86) PCT No.: PCT/US2022/040050
§ 371 (c)(1),
(2) Date: Jan. 26, 2024

(87) PCT Pub. No.: WO2023/018865
PCT Pub. Date: Feb. 16, 2023

(65) Prior Publication Data
US 2025/0009143 A1 Jan. 9, 2025

Related U.S. Application Data

(60) Provisional application No. 63/233,067, filed on Aug. 13, 2021.

(51) Int. Cl.
*G08B 7/00* (2006.01)
*A47D 9/00* (2006.01)
(Continued)

(52) U.S. Cl.
CPC ................. *G08B 7/00* (2013.01); *A47D 9/00* (2013.01); *G06F 3/165* (2013.01); *H04R 1/025* (2013.01)

(58) Field of Classification Search
CPC ...... B60N 2/28; B60N 2/2806; B60N 2/2845; B60N 2/0272; B60N 2/2821; A47D 9/057;
(Continued)

(56) References Cited

U.S. PATENT DOCUMENTS 2,932,821 A 4/1960 Horton
5,865,771 A 2/1999 Shuto et al.
(Continued)

FOREIGN PATENT DOCUMENTS

CN 204862250 U 12/2015
CN 105686473 B 8/2018
(Continued)

OTHER PUBLICATIONS

PCT, "International Search Report and Written Opinion" Application No. PCT/US2022/040050, mailed Nov. 4, 2022, 11 pages.

*Primary Examiner* — Madison Matthews
(74) *Attorney, Agent, or Firm* — Eversheds Sutherland (US) LLP

(57) ABSTRACT

A multi-sensory tactile sound system for a children's product or a children's activity apparatus may include a surface, and at least one transducer disposed on the surface. The surface is connectable to the children's product. The at least one transducer is configured to produce an audio output and a tactile vibration output. A method for implementing a multi-sensory tactile sound system for a children's product may include providing the multi-sensory tactile sound system. The method further includes causing the multi-sensory tactile sound system to produce a first audio output of the plurality of audio outputs and a first tactile vibration output of the plurality of tactile vibration outputs.

6 Claims, 6 Drawing Sheets

(51) Int. Cl.
*G06F 3/16* (2006.01)
*H04R 1/02* (2006.01)

(58) Field of Classification Search
CPC . A47D 1/10; A47D 9/016; A47D 9/02; A47D 13/10; A47D 13/105; A47D 13/107; A47D 9/053; A47D 1/02; A47D 13/025; A47D 13/101; A47D 13/102; A47D 3/00; A47D 9/00; G08B 7/00; G06F 3/165; H04R 1/025; A61M 2021/0022; A61M 2021/0027; A61M 2205/502; A61M 21/02
USPC ............ 297/217.1, 217.4, 250.1, 217.3, 136, 297/183.1, 260.2, 274, 5, 217.2
See application file for complete search history.

(56) References Cited

U.S. PATENT DOCUMENTS

| | | | | |
|---|---|---|---|---|
| 7,703,848 | B1 | 4/2010 | Cochran et al. | |
| 7,895,690 | B2 | 3/2011 | Kovalyak | |
| 7,918,742 | B2 | 4/2011 | Clapper et al. | |
| 7,981,063 | B1 | 7/2011 | Butler | |
| 8,047,888 | B1 * | 11/2011 | Seymore | A47D 9/016 472/36 |
| 8,844,072 | B2 | 9/2014 | Bellows et al. | |
| 8,938,830 | B2 | 1/2015 | Paperno | |
| 9,332,859 | B2 | 5/2016 | Murray | |
| 9,663,004 | B2 | 5/2017 | Perrin et al. | |
| 9,750,350 | B2 | 9/2017 | Armbruster et al. | |
| 9,918,561 | B2 | 3/2018 | Perrin et al. | |
| 9,955,799 | B2 | 5/2018 | Tadipatri et al. | |
| 10,206,850 | B2 | 2/2019 | Dunn et al. | |
| 10,238,341 | B2 | 3/2019 | Rubin et al. | |
| 10,251,552 | B2 | 4/2019 | Bloch-Salisbury et al. | |
| 10,258,761 | B2 | 4/2019 | Smudde | |
| 10,324,460 | B2 | 6/2019 | Sandbothe et al. | |
| 10,463,168 | B2 | 11/2019 | Karp et al. | |
| 10,806,274 | B2 | 10/2020 | Gersin | |
| 10,842,292 | B2 | 11/2020 | Paperno | |
| 10,863,264 | B2 | 12/2020 | Sampson | |
| 10,905,251 | B2 | 2/2021 | Herron | |
| 11,013,345 | B2 | 5/2021 | Arnold, IV et al. | |
| 11,052,221 | B2 | 7/2021 | Karp et al. | |
| 11,054,819 | B2 | 7/2021 | Sandbothe et al. | |
| 11,260,198 | B2 | 3/2022 | Rabin et al. | |
| 2007/0129596 | A1 * | 6/2007 | Dickie | A47D 9/02 600/26 |
| 2011/0245586 | A1 | 10/2011 | Slane | |
| 2015/0015036 | A1 | 1/2015 | Soriano | |
| 2016/0303344 | A1 | 10/2016 | Smudde | |
| 2017/0281899 | A1 * | 10/2017 | Boren | A47D 9/04 |
| 2021/0299398 | A1 | 9/2021 | Chi | |
| 2022/0313560 | A1 | 10/2022 | Rawlinson | |
| 2022/0354255 | A1 | 11/2022 | Juchniewicz | |
| 2022/0362095 | A1 | 11/2022 | Rabin et al. | |
| 2023/0071121 | A1 | 3/2023 | Alteon et al. | |

FOREIGN PATENT DOCUMENTS

| | | | |
|---|---|---|---|
| CN | 215382767 | U | 1/2022 |
| CN | 215779816 | U | 2/2022 |
| CN | 114727705 | A | 7/2022 |
| CN | 110226858 | B | 9/2022 |
| CN | 115023163 | A | 9/2022 |
| CN | 115088987 | A | 9/2022 |
| CN | 115366976 | B | 1/2023 |
| CN | 113558902 | B | 2/2023 |
| WO | 2020193842 | A1 | 10/2020 |
| WO | 2022056325 | A1 | 3/2022 |
| WO | 2023018865 | A1 | 2/2023 |

* cited by examiner

SYSTEMS, METHODS, AND APPARATUSES FOR A MULTI-SENSORY TACTILE SOUND SYSTEM FOR A CHILDREN'S PRODUCT

CROSS-REFERENCE TO RELATED APPLICATIONS

This application is a National Stage of International Application No. PCT/US2022/040050, filed Aug. 11, 2022, which claims priority to and the benefit of U.S. Provisional Application No. 63/233,067, filed Aug. 13, 2021, each of which is hereby incorporated by reference.

TECHNICAL FIELD

The present disclosure is generally directed to children's products, and more particularly to systems, methods, and apparatuses for a multi-sensory tactile sound system for a children's product.

BACKGROUND

Certain sound systems for children's products are known in the art. Sound systems may be integrated into a variety of children's products, such as car seats, strollers, carriers, playards, harnesses, swings, bouncers, and other children's products. At times, a parent may seek to soothe a child, entertain a child, or aid a child in falling asleep, while the child is disposed in the children's product. Thus, a parent may desire that a children's product have multiple features for achieving those outcomes, such as mobiles, lights, vibration units, and the ability to play music. In conventional children's products, the multiple features are produced with separate systems for outputting each feature. For example, conventional children's products may combine a speaker with a secondary vibration unit in order to provide both audio and tactile vibration outputs.

However, such conventional children's products may require larger components, may require higher-powered components, may not provide customized and/or dynamic capabilities, may not offer the synchronization of varying audio and tactile vibration outputs, and may not provide an immersive experience.

SUMMARY

In embodiments, the present disclosure describes a multi-sensory tactile sound system for a children's product. The system may include a surface, and at least one transducer disposed on the surface. The surface is connectable to the children's product. The at least one transducer is configured to produce an audio output and a tactile vibration output.

In embodiments, the present disclosure describes a children's activity apparatus. The apparatus may include a surface, and a multi-sensory tactile sound system including at least one transducer disposed on the surface. The surface is connectable to a children's product. The multi-sensory tactile sound system is configured to produce an audio output and a tactile vibration output.

In embodiments, the present disclosure describes a method for implementing a multi-sensory tactile sound system for a children's product. The method may include providing a multi-sensory tactile sound system. The system may include a surface, and at least one transducer disposed on the surface. The surface is connected to the children's product. The at least one transducer is configured to produce a plurality of audio outputs and a plurality of tactile vibration outputs. The method further includes causing the multi-sensory tactile sound system to produce a first audio output of the plurality of audio outputs and a first tactile vibration output of the plurality of tactile vibration outputs.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout the present disclosure, depending on the context, singular and plural terminology may be used interchangeably.

Figure 1:
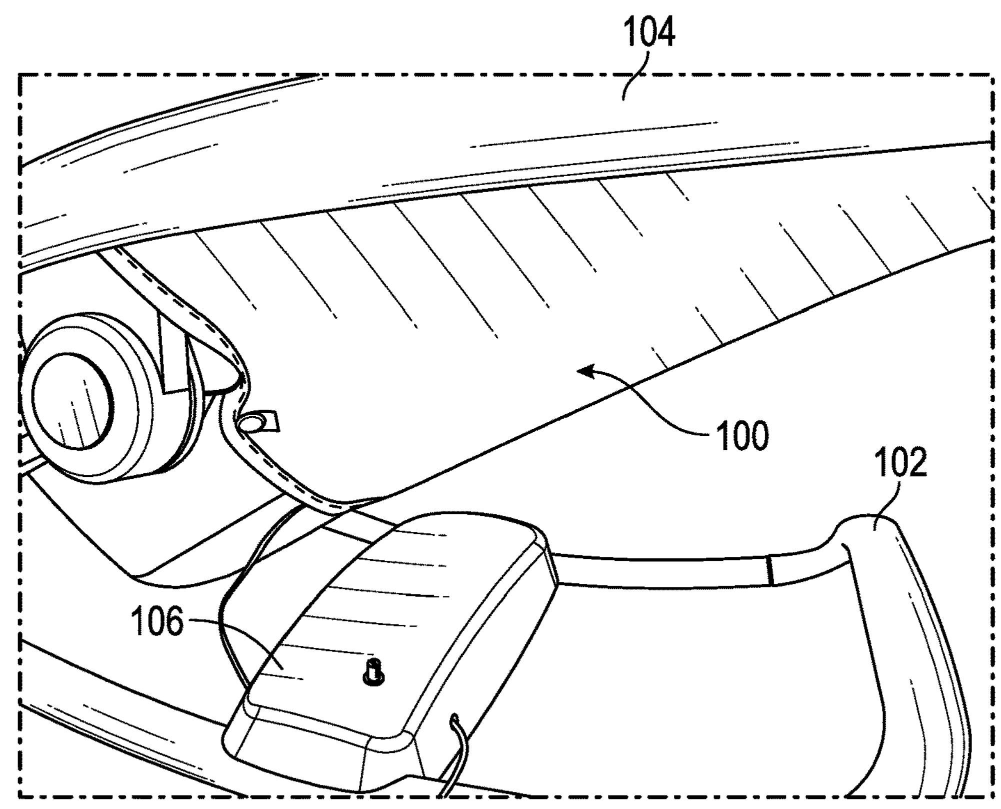
FIG. 1 is a depiction of an example multi-sensory tactile sound system in a children's rocker in accordance with embodiments of the present disclosure.

The present disclosure will now provide a more detailed and specific description that will refer to the accompanying drawings. The drawings and specific descriptions of the drawings, as well as any specific or other embodiments discussed, are intended to be read in conjunction with the entirety of the present disclosure.

DETAILED DESCRIPTION

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that the present disclosure will be thorough and complete, and will fully convey the scope of the concepts to those skilled in the art. Like numbers refer to like, but not necessarily the same or identical elements throughout.

Certain relationships between features of the children's products, such a swing for example, are described herein using the term "substantially" or "substantially equal." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variation that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" or "substantially perpendicular" indicates that the orthogonal relationship is not a strict relationship and does not exclude functionally similar variations therefrom.

The present disclosure relates to, among other things, systems, apparatuses, and methods for a multi-sensory tactile sound system for a children's product. In embodiments, a system, method, and apparatus for a multi-sensory tactile sound system for a children's product may be provided.

In one example embodiment, a system and apparatus for a children's swing having a multi-sensory tactile sound system may be provided. The children's swing may include a base structure, a child container comprising a frame and a cover, a computer processor, and a multi-sensory tactile sound system including at least one transducer disposed within the child container.

In embodiments, a system and apparatus for a children's bassinet having a multi-sensory tactile sound system may be provided. The children's bassinet may include a mattress pad and at least one transducer attached to a mattress platform. In embodiments, the multi-sensory tactile sound system may include an option for a user, such as a parent, to select pre-programmed audio and/or tactile vibration outputs. In embodiments, the multi-sensory tactile sound system may include options for a user, such as a parent, to adjust settings associated with the multi-sensory tactile sound system.

In embodiments, the multi-sensory tactile sound system may include at least one transducer.

In embodiments, the multi-sensory tactile sound system may include at least one transducer surrounded by a shell.

In embodiments, the multi-sensory tactile sound system may operate as a stand-alone system and may be transferred between various children's products.

In embodiments, a method for a children's swing having a multi-sensory tactile sound system may be provided. In another embodiment, a method for a children's bassinet having a multi-sensory tactile sound system may be provided.

Turning to the figures, FIG. 1 depicts a side view of a children's rocker 100 with a multi-sensory tactile sound system. The children's rocker 100 may include a base structure 102 and a child container 104 that is disposed on the base structure 102. The base structure 102 may include a frame for securing the child container 104. The child container 104 may be fixedly or movably secured to the base structure 102. The child container 104 may form a seat or a bed for a child.

The child container 104 is elevated above a surface that the base structure 102 is disposed on. The base structure 102 may further include a computer processor 106 with processing circuitry configured to control a multi-sensory tactile sound system for the children's rocker 100. For example, the computer processor 106 may send and/or receive signals to or from the multi-sensory tactile sound system.

Figure 2:
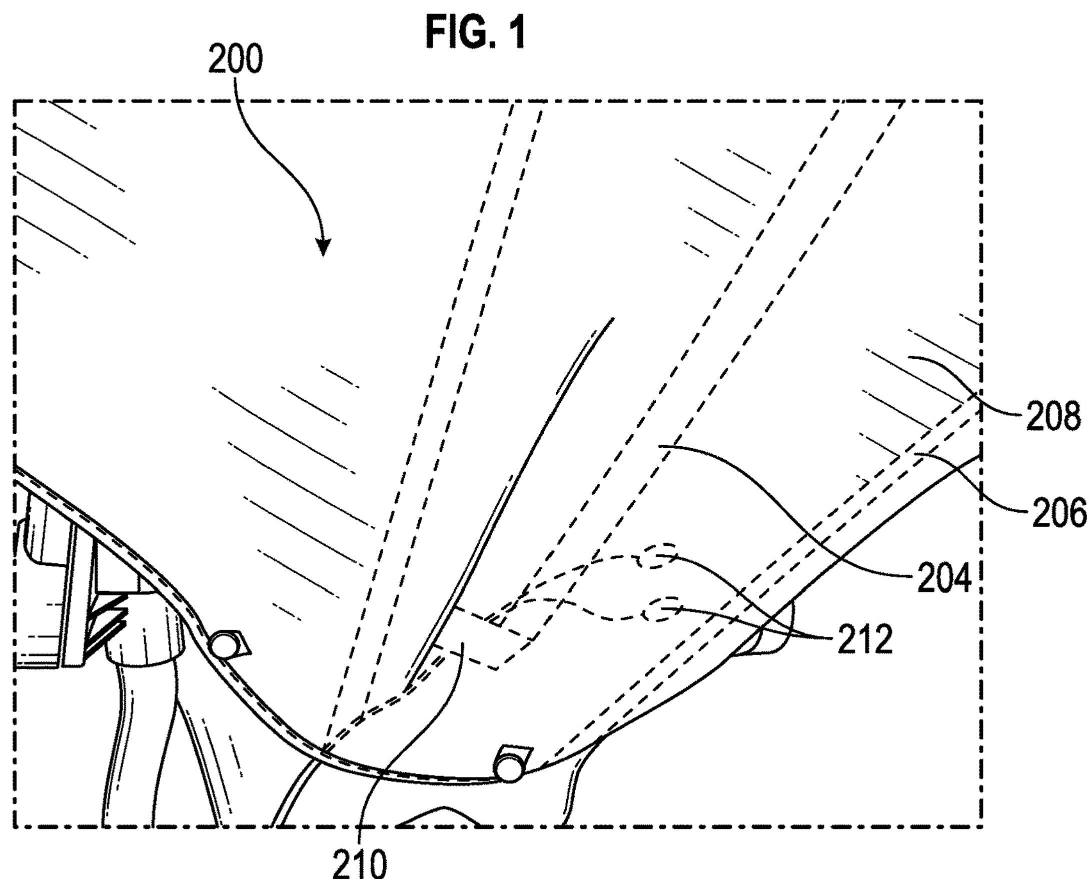
FIG. 2 is a depiction of an example multi-sensory tactile sound system in a children's rocker in accordance with embodiments of the present disclosure.

FIG. 2 further depicts an underside view of a child container 204 of a children's rocker 200. The child container 204 may include a frame 206 and a cover 208. In some embodiments, the frame 206 may include a hard goods material, for example, a metal, an alloy, a rigid plastic, a composite, or combinations thereof. In some embodiments, the cover 208 may include a soft goods material. In some embodiments, the cover 208 may be wrapped around the frame 206 to form the child container 204 capable of supporting and containing a child.

In some embodiments, a multi-sensory tactile sound system 210 may be implemented in the child container 204. In some embodiments, the multi-sensory tactile sound system 210 may be disposed between the frame 206 and the cover 208. For example, the multi-sensory tactile sound system 210 may be mechanically or adhesively coupled or fastened between the frame 206 and the cover 208. In some embodiments, the multi-sensory tactile sound system 210 may include at least one transducer 212. In other embodiments, as depicted in FIG. 2, the multi-sensory tactile sound system 210 may include two transducers 212. The multi-sensory tactile sound system 210 may be connected to processing circuitry, such as the processing circuitry contained in the processor 106 depicted in FIG. 1.

Figure 3:
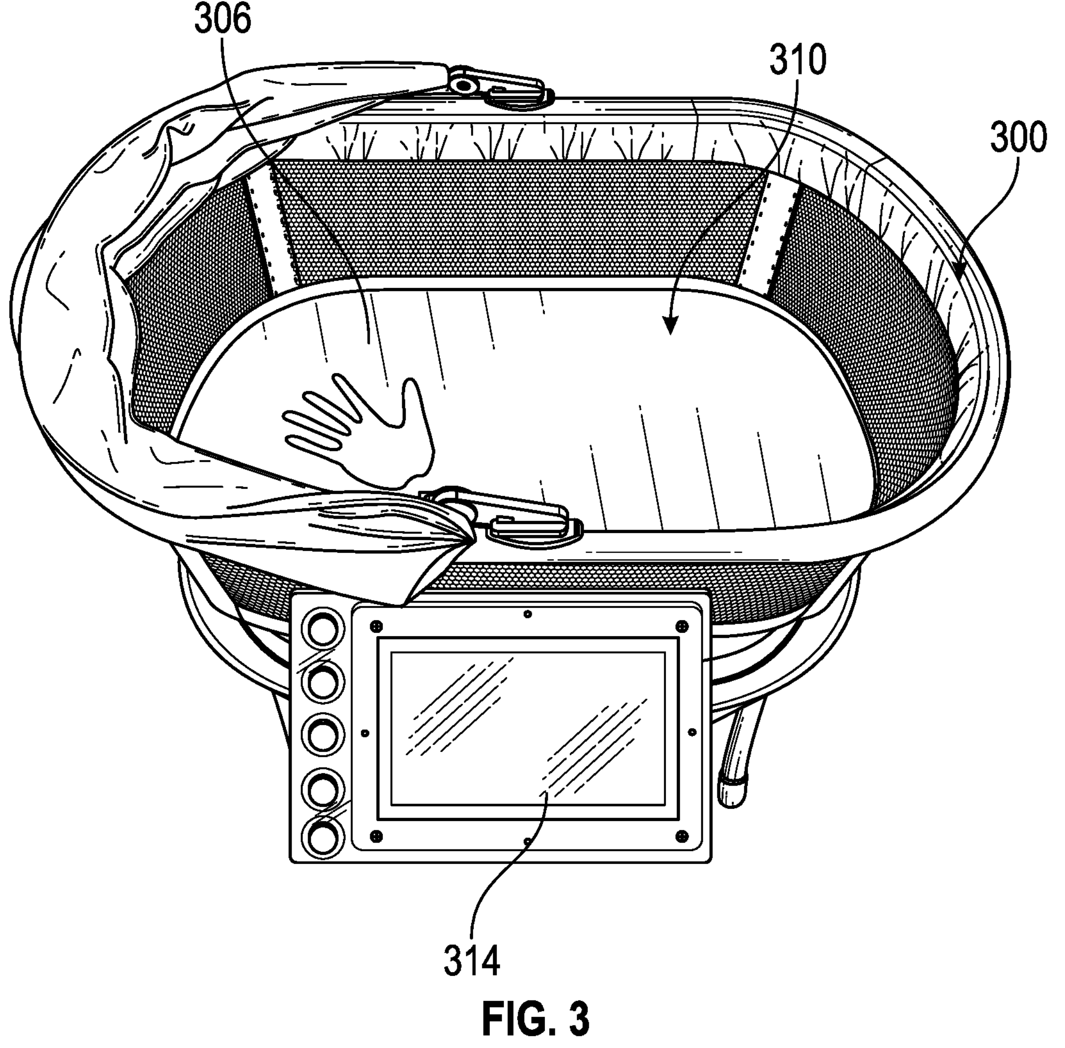
FIG. 3 is a depiction of an example multi-sensory tactile sound system in a children's bassinet in accordance with embodiments of the present disclosure.

In some embodiments, multi-sensory tactile sound systems may be disposed in children's products other than children's swings. For example, as depicted in FIG. 3, a multi-sensory tactile sound system 310 may be disposed within a children's bassinet 300. In some embodiments, a screen 314 or another input device that enables a user to provide input may be attached to the children's bassinet 300 to enable a parent and/or user to easily select a preprogrammed audio track and/or vibration program or track, or transfer audio and/or vibration programs or tracks. The vibration program or track may be synchronized to the audio track, or otherwise be complementary to the audio track. The vibration program or track may include time-dependent patterns of vibrations, and the intensity, frequency, or duration of sections of the vibration program or track may be responsive to the audio track. In embodiments, the audio track may be associated with an audio parameter such as beats per minute, and the vibration program or track may be complementary to a particular value of beats per minute. Thus, more than one vibration program or track may be complementary to an audio track, or to a section of an audio track.

In some embodiments, the multi-sensory tactile sound system 310 may include at least one sensor for detecting a child's response to a current audio output and/or vibration output in real time. In some embodiments, the multi-sensory tactile sound system 310 may be configured to automatically adjust the current audio output and/or vibration output if the detected response of the child is not aligned with the parent's and/or user's desired outcome for the child. For example, a volume, intensity, frequency, speed, or duration of the audio and/or vibration may be changed based on the detected response.

Although not depicted in FIG. 3, the multi-sensory tactile sound system 310 may be mounted to an underside of a mattress platform 306 of the children's bassinet 300. In some embodiments, the mattress platform 306 may be a relatively thin, rigid material. This positioning allows the multi-sensory tactile sound system 310 to be placed directly beneath a child disposed in the children's bassinet 300 to maximize the amount of tactile vibration output experienced by the child. This positioning of the multi-sensory tactile sound system 310 further turns the entire mattress platform 306 into a speaker and produces clear sound at a good volume because of the large, flat nature of the mattress platform 306. Thus, as opposed to a conventional speaker, child may experience more uniform sound coverage regardless of the orientation or position of the multi-sensory tactile sound system 310 within the children's bassinet 300.

Although not depicted in FIG. 3, in another embodiment, an occupant area of the children's bassinet 300 may be designed to be mechanically isolated from the rest of a frame of the children's bassinet 300. Such a configuration may prevent or otherwise minimize any or at least some tactile vibration outputs from traveling to the rest of the frame, objects other than the child disposed in the children's bassinet 300, or the floor. When these unwanted tactile vibration outputs may be eliminated or otherwise minimized, there is less waste, which enables a smaller and/or lower-powered transducer to be used for desired audio and tactile vibration outputs to be experienced by the child. The mechanical isolation of an occupant area from the rest of the product may be applied to other children's products.

Figure 4:
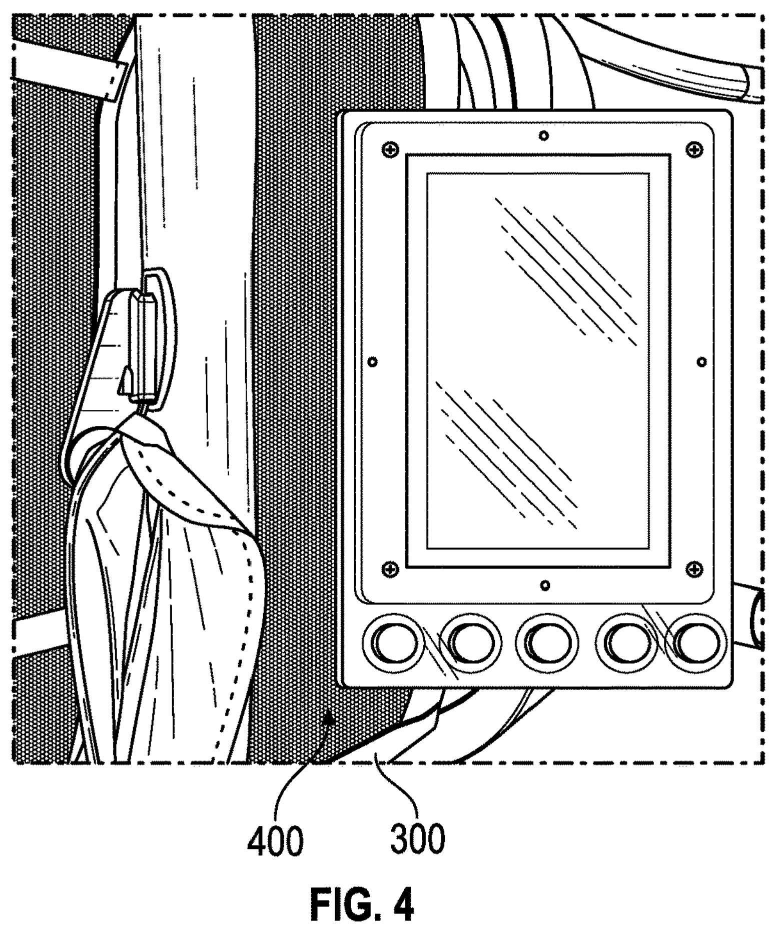
FIG. 4 is a depiction of an example multi-sensory tactile sound system in a demonstrator prototype of a children's bassinet in accordance with embodiments of the present disclosure.

Further, as depicted in FIG. 4, a system 400 may include a multi-sensory tactile sound system and a system to enable a user to select from pre-programmed audio and/or vibration tracks, select a desired audio and/or vibration track, and/or adjust settings associated with the children's bassinet 300.

Figure 5:
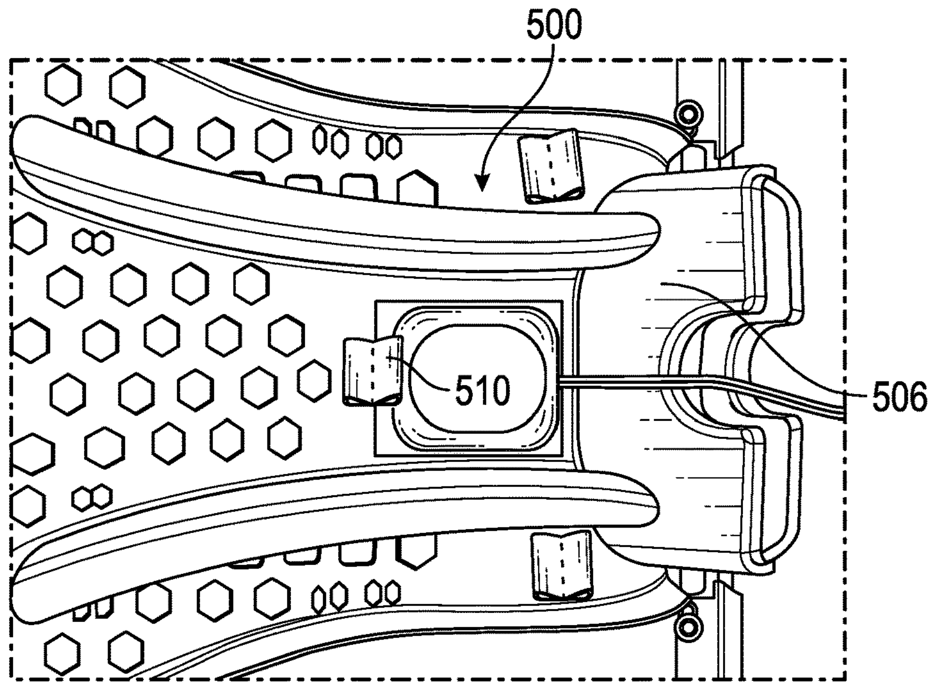
FIG. 5 is a depiction of an example frame of a children's swing having a multi-sensory tactile sound system in accordance with embodiments of the present disclosure.

FIG. 5 depicts a frame 506 of a children's swing 500. As depicted in FIG. 5, the frame 506 may be made of a hard goods material. Furthermore, in some embodiments, the frame 506 may be shaped so as to receive a child that is laying down with his or her upper body being elevated. Further, a multi-sensory tactile sound system 510 may be configured to be attached to an upper surface or a lower surface of the frame 506.

Figure 6:
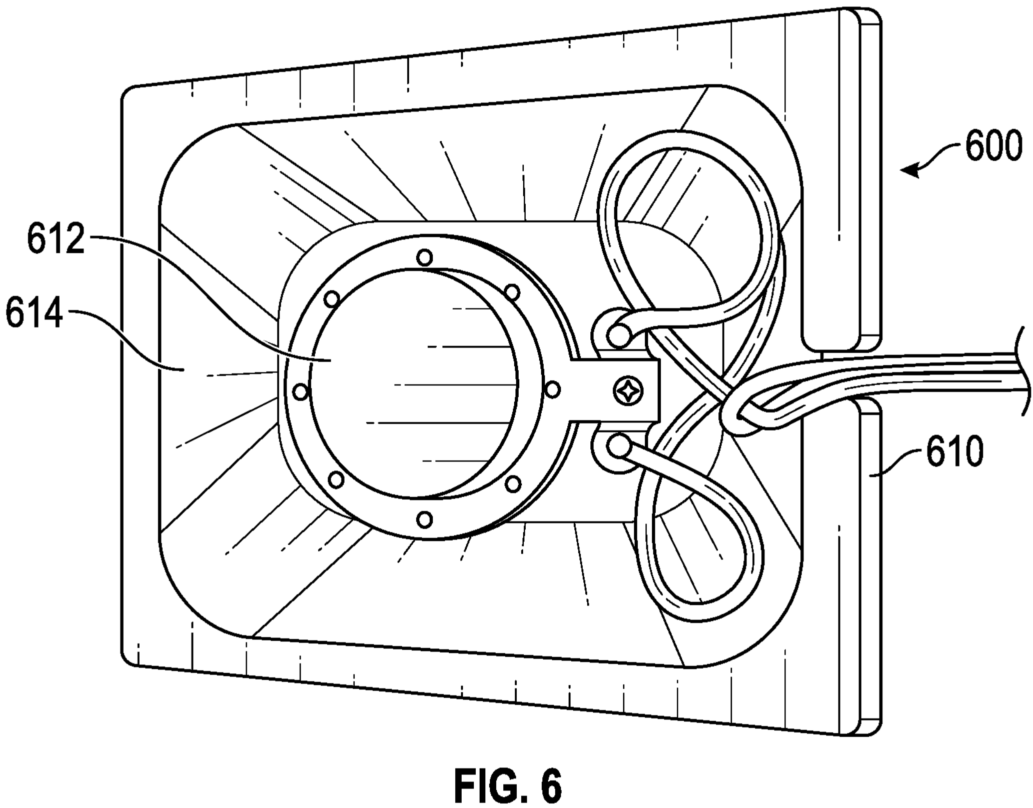
FIG. 6 is a depiction of an example portion of a multi-sensory tactile sound system in accordance with embodiments of the present disclosure.
Figure 7:
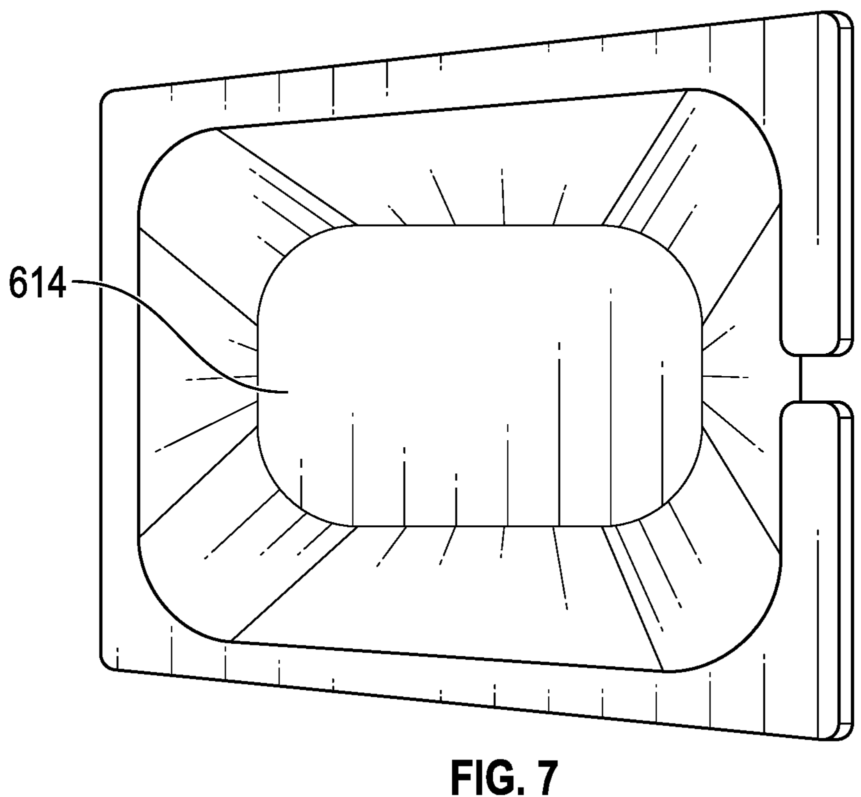
FIG. 7 is a depiction of an example shell for a portion of a multi-sensory tactile sound system in accordance with embodiments of the present disclosure.

FIGS. 6 and 7 depict an example portion 600 of a multi-sensory tactile sound system 610. As depicted in FIG. 7, in embodiments, a transducer 612 may be placed inside a shell 614 of the portion 600, and the transducer 612 may be connected to other processing circuitry to enable the operation of the transducer 612. The shell 614 may be of any shape and size that is capable of containing the transducer 612. The shell 614 may further include any appropriate material to enable audio and tactile vibrations to be experienced by a child disposed in the children's product. The shell 614 may also have a protective function to prevent the transducer 612 from being exposed to damage. The shell 614 may also serve as a relatively more rigid surface for producing audio and/or tactile vibration effects to be experienced by the child than the surfaces of the children's product itself. It should further be noted that the transducer 612 may be disposed on any appropriate surface.

Although not depicted in FIGS. 6 and 7, the multi-sensory tactile sound system 610 may include additional components in addition to the transducer 612, such as an audio amplifier, a power supply, and/or any other components.

Figure 8:
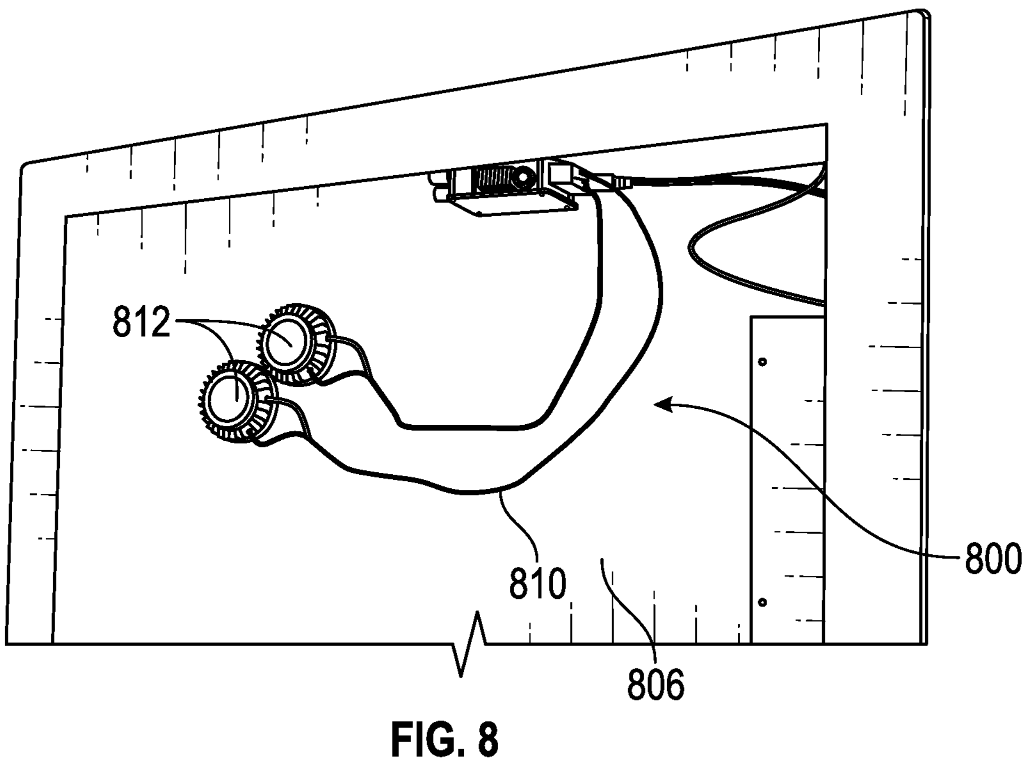
FIG. 8 is a depiction of an example multi-sensory tactile sound system in an adult-sized prototype of the children's bassinet depicted in FIG. 3 in accordance with embodiments of the present disclosure.

FIG. 8 depicts an apparatus 800 including a multi-sensory tactile sound system 810, similar to the children's bassinet depicted in FIG. 3. As depicted in FIG. 8, two transducers 812 may be attached to the prototype 800. In some embodiments, the insert 806 may be flexible and semi-rigid. In some embodiments, the insert 806 may be made of plastic. In some embodiments, the insert 806 may be placed within soft goods. Because the transducers 812 are attached to the insert 806, the insert 806 may serve as a surface from which audio and tactile vibrations are produced, which may then be transferred to a child disposed in the children's bouncer 800 and on the soft goods. In some embodiments, the two transducers 812 may be connected to an audio amplifier.

Figure 9:
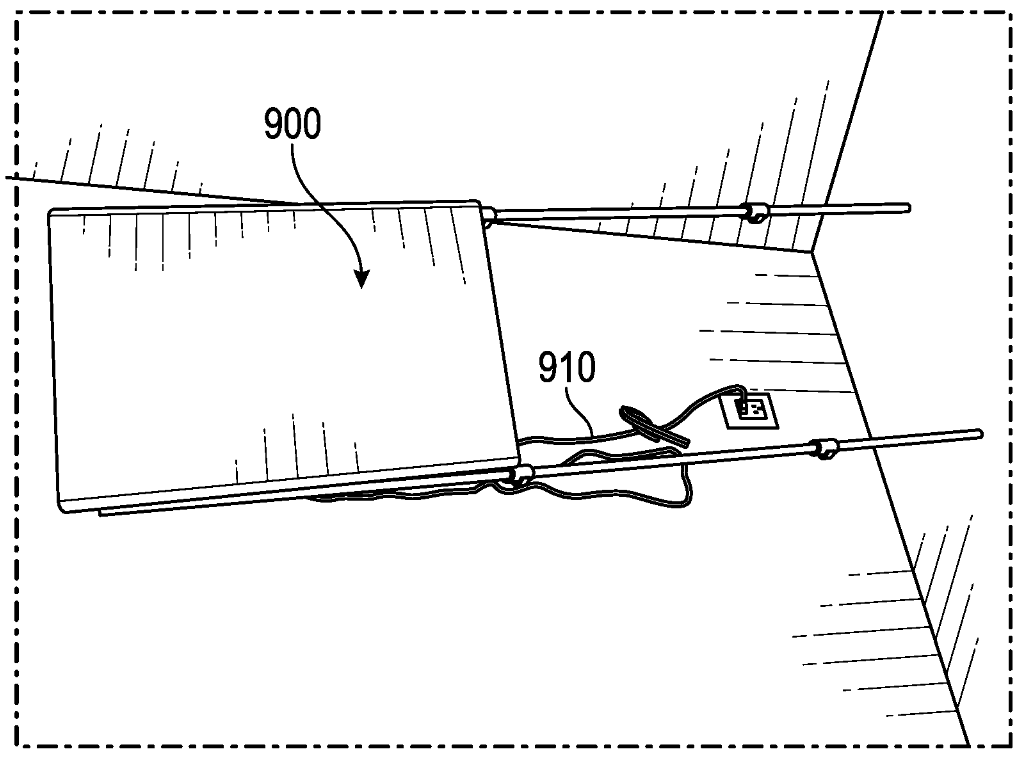
FIG. 9 is a depiction of an example multi-sensory tactile sound system in an adult-sized prototype of the children's bassinet depicted in FIG. 3 in accordance with embodiments of the present disclosure.

FIG. 9 depicts an example multi-sensory tactile sound system 910 disposed in an adult-sized apparatus 900 similar to the children's bassinet depicted in FIG. 3. When the apparatus 900 is leaned up against a wall, an adult may experience audio and tactile vibration that is proportional to that of the children's bassinet 300 depicted in FIG. 3.

Figure 10:
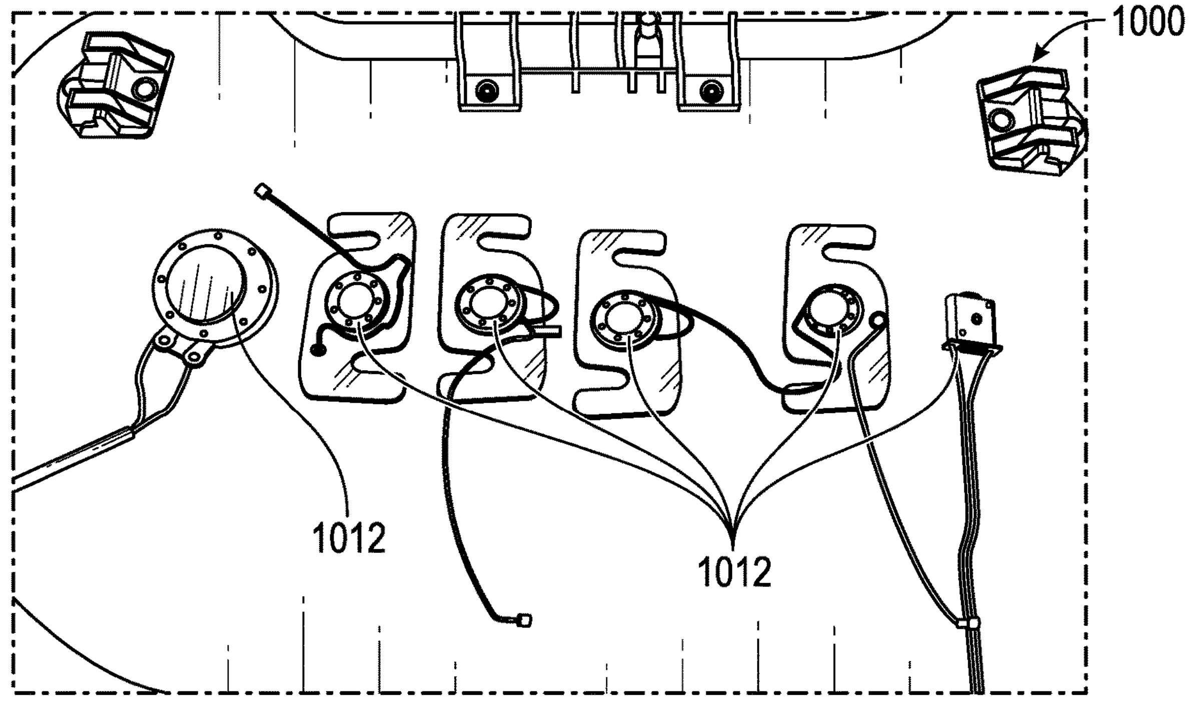
FIG. 10 is a depiction of several example multi-sensory tactile sound systems in accordance with embodiments of the present disclosure.

FIG. 10 depicts example transducers 1012 in a multi-sensory tactile sound system 1000. The various transducers 1012 may have varying sizes and powers, which results in various output audio volumes and/or vibration intensities. While only one transducer 1012 is needed to produce audio and tactile vibrations, more than one transducer 1012 may be desired because additional transducers 1012 may allow for additional panning effects, interactions between separate frequencies, different outputs if one transducer 1012 is used for producing tactile vibrations and the other transducer 1012 is used for producing audio output, and/or for blending the outputs of both transducers 1012.

In some embodiments, two transducers 1012 may be used, where one transducer 1012 is relatively higher-powered and the other transducer 1012 is relatively lower-powered. The higher-powered transducer 1012 may be used for producing tactile vibration outputs, while the other transducer 1012 used for producing audio outputs may be relatively smaller. In such an embodiment, the quality of the audio and tactile vibration outputs would both be improved, and the transducer 1012 for producing audio outputs may be placed in an area to maximize or other increase its effectiveness, such as near the child's head or on a surface that vibrates freely.

In some embodiments, multiple transducers 1012 may be disposed throughout a children's product to produce a desired pattern of tactile vibration outputs. For example, if multiple transducers 1012 are disposed separately from each other, the multi-sensory tactile sound system 1000 may be configured to produce independent vibrations from each of the multiple transducers 1012. For example, the multi-sensory tactile sound system 1000 may be configured to create a sensation of a vibration traveling across a child's body, similar to a gentle massage traveling from the child's head to foot.

Certain embodiments of the multi-sensory tactile sound systems 1000 may provide unique benefits when compared to conventional children's products. For example, certain embodiments of the use of the transducers 1012 may provide sound at a relatively higher quality than typically found in children's products. In some embodiments, such as in the children's bassinet 300 (or other apparatus according to the present disclosure), the multi-sensory tactile sound systems 1000 may provide a multi-sensory and immersive experience, which may be enhanced by pre-programmed media content that may be selected by a user (for example, through the kiosk screen 314 depicted in FIG. 3). In some embodiments, specific audio and tactile vibration patterns, such as patterns from a car ride in an actual vehicle (such as a vehicle owned by a parent), a mother's heartbeat, a specific patting rhythm used by a parent on a child, and other patterns, may be recorded and then reproduced at the children's product. In some embodiments, additional components, such as a microphone, an accelerometer, a smart mobile device, and/or other components may be required in order to provide the recordation and reproductive capabilities of the multi-sensory tactile sound system 1000.

For example, in embodiments, when the audio output is the sound of the ocean, the child may feel a tactile vibration output similar to the crashing of or movement of waves. In another embodiment, when the audio output is a car ride, the child may feel a tactile vibration output similar to vibrations and rumbling from driving a car on a road. These example embodiments may thus provide a synchronized and immersive soundscape.

In some embodiments, an input device may be configured to be connected to a mobile application ("app") or computer-based application program for a user to purchase additional media content.

In a conventional tactile sound transducer system, any audio file may be played through a sound transducer, but the tactile vibration output may be any number of the relevant lower frequencies already existing in the audio file. The relevant lower frequencies that already exist in the audio file may vary greatly from audio file to audio file, thus reducing a user's ability to exercise control over the tactile vibration output and creating inconsistent tactile vibration outputs. The frequency response of each transducer installed in a children's product may be analyzed, thus enabling the identification of desired frequencies that produce a relatively soothing and effective tactile vibration outputs within the children's product. The desired frequencies may vary based on the transducer being used and the characteristics of the children's product that the multi-sensory tactile sound system is implemented in. When the desired frequencies have been identified, the multi-sensory tactile sound system 1000 may assign the desired frequencies and play those desired frequencies regardless of the audio file being played. In some embodiments, the desired frequencies may be assigned to a MIDI instrument, thus enabling the composition of the vibration track. A user, such as a parent, may thus have control over a type, an intensity, and a variation of any tactile vibration outputs that accompany an audio file. The separation of the desired frequencies for tactile vibration outputs and the audio file further enables tactile vibration outputs without any audio outputs (or what is known as a vibration-only mode).

Further, the multi-sensory tactile sound system 1000 may boost the desired frequencies and filter out all undesired frequencies to maximize the tactile vibration outputs at a power level input. This reduces power waste, since no power is wasted to produce audio and tactile vibration outputs that are not easily distinguished by the child.

Additionally, the use of the transducers 1012 allows for children's products to generate audio and tactile vibrations with relatively fewer components, no moving parts in the children's product, and an overall relatively longer product life. Further, because a transducer 1012 is not limited to the natural frequency of an eccentric mass motor, the multi-sensory tactile sound system 1000 may provide dynamic vibration capabilities. Instead of having only a limited number of settings (such as a High, Medium, and Low setting option), the tactile vibration outputs may be as dynamic as the audio file. In some embodiments, the multi-sensory tactile sound system 1000 may be used to produce pre-selected sleep-inducing vibration frequencies. In other embodiments, the multi-sensory tactile sound system 1000 may be used to produce pre-selected soothing vibration frequencies. In other embodiments, the multi-sensory tactile sound system 1000 may be used to produce pre-selected entertainment vibration frequencies. Thus, the multi-sensory tactile system 1000 may be more effective at generating relatively soothing and entertaining a child due to the wide range of audio and tactile vibrations that may be produced.

In some embodiments, the multi-sensory tactile sound system 1000 may be configured to cross-fade between audio and tactile vibration outputs. Thus, a user (for example, a parent) may adjust the proportion of audio outputs to tactile vibration outputs, ranging from only audio output and no tactile vibration output, to only tactile vibration output and no audio output.

In some embodiments, the multi-sensory tactile sound system 1000 may be compatible with user-provided audio sources.

In one other embodiment, the multi-sensory tactile sound system 1000 may include a transducer for providing tactile vibration outputs, coupled to a standard speaker for producing audio output. This embodiment may provide a broader range of tactile vibration outputs by using a transducer instead of a standard vibration motor.

In another embodiment, the multi-sensory tactile sound system 1000 may include a traditional speaker coupled with a separate vibration-producing element, such as a solenoid or a vibration motor.

In other embodiments, other children's products could also be configured to include the multi-sensory tactile sound system 1000.

In embodiments, a playard may include the multi-sensory tactile sound system 1000 below a bottom surface of the playard. Because playards are larger in size, surface area, and mass, it may be desirable to use larger and/or higher-powered transducers 1012 in a playard. Additionally, because relatively larger children of a higher weight or mass may use playards, a greater damping effect on the audio and/or tactile vibration outputs should be accounted for when designing the multi-sensory tactile system 1000.

In embodiments, nappers and high chairs may include the multi-sensory tactile sound system 1000, in a similar manner to the multi-sensory tactile sound systems incorporated in children's swings and bouncers as described above. However, because such children's products often involve slung or suspended seats, and because such products often include soft goods, the design of such products and the materials used in such products may, in some instances, not be desired for producing sufficient audio and tactile vibration outputs from a transducer. Thus, additional considerations relating to placement and product design may be necessary in the case of such children's products. In embodiments, the addition of a conducive surface may overcome this problem, or the addition of a separate insert within the soft goods may overcome this problem. If the multi-sensory tactile sound system 1000 is placed on a frame or at a location further away from a child, a larger and/or higher-powered transducer may be needed for operation of the multi-sensory tactile sound system 1000.

In embodiments, a car seat may also include the multi-sensory tactile sound system 1000. In such an embodiment, the multi-sensory tactile sound system 1000 may require additional components, such as a battery power source, sensors, and/or other components to enable the implementation of the multi-sensory tactile sound system 1000 in a car seat. As described above, when the multi-sensory tactile sound system 1000 records and reproduces car ride audio and tactile vibration output patterns, the car seat may be configured to loop and replay such a recording, thus ensuring that a car seat may be removed from a car while the audio and tactile vibration outputs experienced by a child continue. This may prevent or otherwise minimize disruption to the child and may provide a unique solution to the problem of a child waking up or becoming fussy when a car stops or the engine turns off.

In embodiments, the multi-sensory tactile sound system 1000 may be a stand-alone system that may be transferred between various children's products. Thus, the multi-sensory tactile sound system 1000 may be used with other system-compatible products with sufficient results, and the multi-sensory tactile sound system 1000 may be used with other non-compatible products with certain results. If the multi-sensory tactile sound system 1000 is enclosed in a shell or housing, such as the shell 614 depicted in FIGS. 6 and 7, the multi-sensory tactile sound 1000 may be transferable between various soft products, such as a pillow, a mattress, a pad, a stuffed animal, or any other soft product.

Aspects

Aspect 1: A multi-sensory tactile sound system for a children's product, the system including:

a surface; and at least one transducer disposed on the surface, where the surface is connectable to the children's product, and where the at least one transducer is configured to produce an audio output and a tactile vibration output.

Aspect 2: The multi-sensory tactile sound system of aspect 1, where the children's product is at least one of: a swing, a bassinet, a bouncer, a napper, a high chair, a stroller, a seat, or a car seat.

Aspect 3: The multi-sensory tactile sound system of aspects 1 or 2, where the children's product is a swing, the swing further including:

a frame; and a cover including soft goods disposed on or around the frame, where the surface is inserted into the soft goods.

Aspect 4: The multi-sensory tactile sound system of any of aspects 1 to 3, where the children's product is a bassinet having a mattress platform, and the surface is the mattress platform.

Aspect 5: The multi-sensory tactile sound system of any of aspects 1 to 4, where the audio output and the tactile vibration output are selected by a user, independently generated, or synchronized to achieve an intended behavior of a child.

Aspect 6: The multi-sensory tactile sound system of any of aspects 1 to 5, further including:

an input device, where the user may select the audio output and the tactile vibration output by entering a selection on the input device.

Aspect 7: A children's activity apparatus including:

a surface; and a multi-sensory tactile sound system including at least one transducer disposed on the surface, where the surface is connectable to a children's product, and where the multi-sensory tactile sound system is configured to produce an audio output and a tactile vibration output.

Aspect 8: The apparatus of aspect 7, where the children's product is at least one of: a swing, a bassinet, a bouncer, a napper, a high chair, a stroller, a seat, or a car seat.

Aspect 9: The apparatus of aspects 7 or 8, where the children's product is a swing, further including:

a frame; and a cover including soft goods disposed on or around the frame, where the surface is inserted into the soft goods.

Aspect 10: The apparatus of any of aspects 7 to 9, where the children's product is a bassinet having a mattress platform, where the surface is the mattress platform.

Aspect 11: The apparatus of any of aspects 7 to 10, where the audio output and the tactile vibration output are selected by a user, independently generated, or synchronized to achieve an intended behavior of a child.

Aspect 12: The apparatus of any of aspects 7 to 11, further including:

an input device, where the user may select the audio output and the tactile vibration output by entering a selection on the input device.

Aspect 13: A method for implementing a multi-sensory tactile sound system for a children's product, the method including:

providing a multi-sensory tactile sound system including:

a surface; and at least one transducer disposed on the surface, where the surface is connected to the children's product, and where the at least one transducer is configured to produce a plurality of audio outputs and a plurality of tactile vibration outputs; and causing the multi-sensory tactile sound system to produce a first audio output of the plurality of audio outputs and a first tactile vibration output of the plurality of tactile vibration outputs.

Aspect 14: The method of aspect 13, where the children's product is at least one of: a swing, a bassinet, a bouncer, a napper, a high chair, a stroller, a seat, or a car seat.

Aspect 15: The method of aspects 13 or 14, where the children's product is a swing, further including:

a frame; and a cover including soft goods disposed on or around the frame.

Aspect 16: The method of aspect 15, where the surface is inserted into the soft goods.

Aspect 17: The method of any of aspects 13 to 16, where the children's product is child bassinet having a mattress platform.

Aspect 18: The method of aspect 17, where the surface is the mattress platform.

Aspect 19: The method of any of aspects 13 to 18, where the first audio output and the first tactile vibration output are selected by a user, independently generated, or synchronized to achieve an intended behavior of a child.

Aspect 20: The method of any of aspects 13 to 19, wherein the multi-sensory tactile sound system further includes:

an input device, where the user may select the first audio output and the first tactile vibration output by entering a selection on the input device.

Though the disclosed examples include particular arrangements of a number of parts, components, features, and aspects, the present disclosure is not limited to only those examples or arrangements shown. Any one or more of the parts, components, features, and aspects of the present disclosure may be employed alone or in other arrangements of any two or more of the same.

Although certain product features, functions, components, and parts have been described herein in accordance with the teachings of the present disclosure, the scope of coverage of this patent is not limited thereto. On the contrary, the present disclosure covers all embodiments of the teachings of the present disclosure that fairly fall within the scope of permissible equivalents.

Unless otherwise noted, the terms used herein are to be understood according to conventional usage by those of ordinary skill in the relevant art. In addition to the definitions of terms provided below, it is to be understood that as used in the specification and in the claims, "a" or "an" may mean one or more, depending upon the context in which it is used.

Throughout this application, the term "include," "include (s)" or "including" means "including but not limited to." Note that certain embodiments may be described relating to a single component, but the corresponding description should be read to include embodiments of two or more components. Different features, variations, and multiple different embodiments are shown and described herein with various details. What has been described in this application at times in terms of specific embodiments is done for illustrative purposes only and without the intent to limit or suggest that what has been conceived is only one particular embodiment or specific embodiments. It is to be understood that the present disclosure is not limited to any single specific embodiments or enumerated variations. Many modifications, variations and other embodiments will come to mind of those skilled in the art, and which are intended to be and are in fact covered by the present disclosure. It is indeed intended that the scope of the present disclosure should be determined by a proper legal interpretation and construction of the present disclosure, including equivalents, as understood by those of skill in the art relying upon the complete disclosure present at the time of filing.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, methods, apparatuses, devices, and techniques that, individually and in combination, provide for a multi-sensory tactile sound system for a children's product. It is, of course, not possible to describe every conceivable combination of components and/or methods for purposes of describing the various elements of the present disclosure, but it may be recognized that many further combinations and permutations of the disclosed elements are possible. Accordingly, it may be apparent that various modifications may be made to the present disclosure without departing from the scope thereof. In addition, or as an alternative, other embodiments of the present disclosure may be apparent from consideration of the specification and annexed drawings, and practice of the present disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

The invention claimed is:

1. A multi-sensory tactile system for soothing a child in a car seat, the system comprising:

one or more transducers configured to generate vibration output and to be coupled to the car seat such that the one or more transducer mechanically interfaces with the car seat;

one or more speakers configured to generate audio output and to be coupled to the car seat such that the audio output is directed at the car seat;

at least one sensor configured to detect a response of the child;

one or more processors configured to be coupled to the car seat and configured to execute computer-executable instructions to:

cause the one or more transducers to generate a first vibration output corresponding to one or more of a first intensity, a first speed, or a first pattern;

cause the one or more speakers to generate a first audio output corresponding to one or more of a first volume or a first duration;

automatically determine, based on the detected response of the child, to adjust the first vibration output and the first audio output;

determine a second vibration output corresponding to one or more of a second intensity, second speed, or a second pattern;

determine a second audio output corresponding to one or more of a second volume or a second duration; and cause the one or more transducers to generate the second vibration output and the one or more speakers to generate the second audio output, wherein the second vibration output is synced temporally with the second audio output.

2. The multi-sensory tactile system of claim 1, wherein one or more of the first audio output or second audio output is generated by a car audio system.

3. The multi-sensory tactile system of claim 1, wherein one or more of the first vibration output or second vibration output is indicative of car vibrations.

4. The multi-sensory tactile system of claim 1, further comprising a housing, wherein the one or more transducers, the one or more speakers, and the one or more processors are each disposed in the housing.

5. The multi-sensory tactile system of claim 1, wherein the second vibration output is synced temporally with the first audio output.

6. The multi-sensory tactile system of claim 1, further comprising an input device, wherein the input device is coupled to the car seat and configured to receive input data from a user.

* * * * *